United States Patent
Trebouet

(10) Patent No.: US 12,049,202 B2
(45) Date of Patent: Jul. 30, 2024

(54) SYSTEM FOR CLEANING A PLURALITY OF SENSORS OF A MOTOR VEHICLE

(71) Applicant: Valeo Systèmes d'Essuyage, Le Mesnil Saint Denis (FR)

(72) Inventor: Marcel Trebouet, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 576 days.

(21) Appl. No.: 17/279,996

(22) PCT Filed: Sep. 25, 2019

(86) PCT No.: PCT/EP2019/075941
§ 371 (c)(1),
(2) Date: Mar. 25, 2021

(87) PCT Pub. No.: WO2020/064880
PCT Pub. Date: Apr. 2, 2020

(65) Prior Publication Data
US 2022/0032879 A1    Feb. 3, 2022

(30) Foreign Application Priority Data
Sep. 28, 2018 (FR) ...................................... 1858951

(51) Int. Cl.
*B60S 1/56* (2006.01)
*B08B 3/02* (2006.01)
(Continued)

(52) U.S. Cl.
CPC ...... *B60S 1/56* (2013.01); *B08B 3/02* (2013.01); *B08B 5/02* (2013.01); *B08B 13/00* (2013.01);
(Continued)

(58) Field of Classification Search
None
See application file for complete search history.

(56) References Cited

U.S. PATENT DOCUMENTS

| | | |
|---|---|---|
| 2016/0339875 A1 | 11/2016 | Ina et al. |
| 2018/0015907 A1 | 1/2018 | Rice |
| 2021/0362688 A1 | 11/2021 | Kawamura et al. |

FOREIGN PATENT DOCUMENTS

| | | |
|---|---|---|
| DE | 19537790 A1 | 4/1996 |
| DE | 10115975 A1 | 10/2002 |

(Continued)

OTHER PUBLICATIONS

Google Patents translation of DE10115975A1 (Year: 2023).*
(Continued)

*Primary Examiner* — Eric W Golightly
(74) *Attorney, Agent, or Firm* — Osha Bergman Watanabe & Burton LLP

(57) ABSTRACT

A system for cleaning a plurality of sensors of a motor vehicle includes a plurality of devices for spraying a cleaning fluid onto the sensors and a cleaning fluid storage reservoir. The cleaning system includes a distribution circuit connected to the storage reservoir and to which each of the spray devices is connected via a solenoid valve. The cleaning system further includes an electronic management unit for controlling the operation of at least the distribution circuit. In addition, the cleaning system includes an electronically controlled pump, the electronic control unit of which modifies a parameter pertaining to the flow of the cleaning fluid in the distribution circuit.

7 Claims, 2 Drawing Sheets

(51) Int. Cl.
  *B08B 5/02*   (2006.01)
  *B08B 13/00*  (2006.01)
  *B60S 1/50*   (2006.01)
  *B60S 1/52*   (2006.01)

(52) U.S. Cl.
  CPC . *B60S 1/50* (2013.01); *B60S 1/52* (2013.01); *B08B 2203/027* (2013.01)

(56) References Cited

FOREIGN PATENT DOCUMENTS

| | | |
|---|---|---|
| DE | 102014200097 A1 | 7/2015 |
| DE | 102015015645 A1 | 6/2017 |
| JP | 2000142328 A | 5/2000 |
| JP | 2013100077 A | 5/2013 |
| WO | 2017202562 A1 | 11/2017 |
| WO | 2017202625 A1 | 11/2017 |
| WO | 2018135469 A1 | 7/2018 |
| WO | 2018187089 A1 | 10/2018 |
| WO | 2018188823 A1 | 10/2018 |
| WO | 2018189019 A1 | 10/2018 |
| WO | 2019-172306 A1 | 9/2019 |

OTHER PUBLICATIONS

International Search Report and Written Opinion in corresponding International Application No. PCT/EP2019/075941, mailed Dec. 5, 2019 (13 pages).

Notification of Reason for Rejection in corresponding Japanese Application No. 2021-517188, dated May 24, 2022 (14 pages).

Office Action Issued in Corresponding CN Application No. 201980063562.1, Dated Apr. 5, 2023. (27 pages with English Translation).

Liisa, "Innovative electronics from HELLA", Automotive & Accessories, Issue 40, pp. 34-35, 2012-10-01 (2 pages), not in English.

* cited by examiner

SYSTEM FOR CLEANING A PLURALITY OF SENSORS OF A MOTOR VEHICLE

BACKGROUND

The invention relates to the field of cleaning systems fitted on motor vehicles. It relates more particularly to systems for cleaning sensors with which such vehicles are fitted.

Vehicles, and particularly motor vehicles, increasingly comprise automated systems that are driving assistance systems. Such driving assistance systems comprise one or more module(s) for detecting the surroundings of the vehicle and parameters external to this vehicle, and also at least one control unit configured to interpret the information thus gathered and to make decisions that need to be made as a result of this information.

Therefore, it will be understood that it is important to check that these detection modules are operating properly throughout the lifetime of the vehicle. In particular, these detection modules are usually arranged on the outside of the vehicle, for example carried on the body of this vehicle, and may for example get dirty, possibly making it difficult, even impossible, for these detection modules to acquire information. Therefore, it is necessary to provide a cleaning system capable of effectively removing the detritus, dirt, organic matter and other disruptive elements that may be deposited and hamper the acquisition of images by these detection modules. One known solution is to spray a quantity of washer fluid onto an optical surface of the detection module in question and then to dry this surface, but it should be noted that such a solution can be costly in terms of washer fluid, or water, if large amounts are sprayed without a particular strategy, even more so in the case of self-driving vehicles in which numerous detection modules are employed around the perimeter of the vehicle.

Various architectures of such cleaning systems comprising a plurality of cleaning-product spray devices are known. These spray devices are positioned, for example, on the front face and/or on the rear face and/or on a side-view mirror of the vehicle so as, for example, to allow one or more glass surfaces associated with one or more sensors to be cleaned.

To supply these spray devices with cleaning product, the architecture of the cleaning system includes a reservoir and a pump linked to each of the spray devices via one or more solenoid valves routing the cleaning product supplied from the reservoir to lines that are respectively associated with each of the spray devices of the vehicle. Thus, in such an architecture, the spray devices are supplied by the pump of the cleaning system separately from one another, the aforementioned solenoid valve directing the cleaning product pumped from the reservoir toward one or another of the lines.

In a context of increasing development of driver assistance devices on motor vehicles, and in the context of the development of self-driving vehicles, the number and the type of sensors installed on a vehicle is becoming increasingly great. These sensors, depending on their type, have cleaning requirements and constraints which may vary very widely, for example in terms of quantity and/or flow rate of cleaning product to be used. However, with an architecture like the one that has just been briefly outlined, the parameters regarding the delivery of the cleaning product are the same regardless of what sensor is to be cleaned, and it will be appreciated that these parameters are defined according to the sensor for which these requirements are the most demanding. The use of an architecture as outlined hereinabove may therefore lead to a consumption of cleaning product that is not needed in relation to the cleaning requirements of the various sensors.

SUMMARY

The object of the present invention is to overcome this disadvantage and to propose a cleaning system the implementation of which does not lead to needless consumption of cleaning product, while at the same time conforming to the quality-of-cleaning requirements of various sensors installed on the vehicle.

To this end, one subject of the invention is a system for cleaning a plurality of sensors of a motor vehicle, comprising a plurality of devices for spraying a cleaning fluid onto the sensors and comprising a cleaning fluid storage reservoir, the cleaning system comprising a distribution circuit connected to the storage reservoir and to which each of the spray devices is connected via a solenoid valve specific to it, the cleaning system further comprising an electronic management unit configured to control the operation of at least the distribution circuit, characterized in that it comprises an electronically controlled pump, the electronic control unit of which is configured to modify a parameter pertaining to the flow of the cleaning fluid in the distribution circuit.

What is meant here by cleaning a sensor is an operation of cleaning an optical surface, for example a transparent glass surface, of this sensor, in order to remove therefrom a certain amount of dust, debris or dirt whose presence, on the optical surface of the sensor in question, may detract from the quality of the detection and/or the measurement performed by this sensor.

The cleaning fluid may, according to various examples, be a liquid or gaseous product that can be sprayed onto an optical surface as mentioned hereinabove, with a view to cleaning the same. According to various non-exhaustive examples, the cleaning fluid may be water, a washer fluid, or air.

The distribution circuit here refers to a collection of ducts and pipes configured to convey the cleaning fluid from the storage reservoir of the cleaning system according to the invention as far as the various devices for spraying this cleaning fluid onto the optical surfaces of the plurality of sensors. According to one example, the distribution circuit comprises a main duct from which there extends a plurality of branches each of which is configured to convey the cleaning fluid to one or more sensors. More specifically, the branches of the distribution circuit are configured to convey the cleaning fluid toward one or more spray devices associated with one or more sensors. As has already been specified, the distribution circuit also comprises a plurality of solenoid valves governing the circulation of the cleaning fluid in the aforementioned branches, namely between the fluid storage reservoir and the spray devices.

The electronic management unit, configured to control the operation of at least the distribution circuit, notably controls the operation of the solenoid valves. According to one example, the electronic management unit also controls the operation of one or more devices for spraying the cleaning fluid onto the optical surfaces of the corresponding sensors.

According to the invention, the distribution circuit comprises a pump of the so-called electronically controlled type, configured to modify a parameter pertaining to the flow of the cleaning fluid in the distribution circuit. Such a pump notably comprises electronic control unit configured to modify the rotational speed of the electric motor that governs the operation thereof, on the basis of a variation in the control signal controlling the operation of this electric motor.

According to the invention, the electronically controlled pump is configured to modify a parameter pertaining to the flow of the cleaning fluid. More specifically, the invention makes provision that, when an operation of cleaning one or more sensors is to be performed, the electronically controlled pump is operated in such a way as to modify a parameter pertaining to the flow of the cleaning fluid in the corresponding branch or branches of the fluid circuit, so as to optimize the consumption of cleaning fluid according to the nature of the sensor or sensors to be cleaned.

According to various examples, the aforementioned flow parameter may be the pressure or the flow rate of the cleaning fluid. The invention thus makes it possible to adjust the chosen flow parameter, for example a pressure of the cleaning fluid, in one or more branches of the distribution circuit supplying spray devices associated with the sensors that are to be cleaned. In other words, the invention makes it possible to modulate the flow of the cleaning fluid intended to be sprayed onto one or more sensors of a motor vehicle equipped with a cleaning system according to the invention.

The electronic management unit, that controls the operation of the solenoid valves governing the distribution of cleaning fluid in the various branches of the distribution circuit, and the electronic control unit of the electronically controlled pump are therefore advantageously connected to one another and are respectively configured to communicate with each other.

As mentioned hereinabove, the cleaning system comprises an electronically controlled pump having an electronic control unit that is configured to modify a parameter pertaining to the flow of the cleaning fluid in the distribution circuit. The modification of the parameter pertaining to the flow of the cleaning fluid is dependent on parameters specific to the types of sensors that are to be cleaned and/or dependent on parameters relating to the environment external to the vehicle and notably the ambient temperature and/or relating to parameters concerned with the driving of the vehicle and in particular the speed thereof.

In other words, the electronic control unit of the electronically controlled pump is configured to generate an instruction for controlling the electronically controlled pump according to various parameters that the electronic control unit is able to detect or receive. The control instruction should be understood here in the broadest sense as being a combined instruction for controlling the operation of the electronically controlled pump and for the electronically controlled pump to adjust the chosen flow parameter. According to one example, these instructions for controlling the operation of the electronically controlled pump and for adjusting the chosen flow parameter may be simultaneous.

According to one feature of the invention, the electronic control unit is configured to generate an instruction for controlling the electronically controlled pump on the basis of data relating to the nature of the sensor or sensors to be cleaned.

According to one example, the data item relating to the nature of the sensor or sensors to be cleaned may be the type of these sensors. By way of nonlimiting example, the fluid pressure required for cleaning a sensor of a remote-detection device operating by emitting/receiving electromagnetic waves of the LIDAR (Light Detection And Ranging) type is of the order of 4 bar, whereas the fluid pressure needed for cleaning a sensor of a viewing camera is of the order of 2 bar.

By adjusting, for example, the pressure within the branches of the distribution circuit supplying cleaning fluid to various sensors such as the aforementioned, the invention therefore makes it possible to optimize the cleaning fluid consumption within the vehicle.

The invention thus achieves its stated objective by proposing, for various types of sensors installed on a motor vehicle, effective cleaning without needless consumption of cleaning fluid. This also allows the capacity of the cleaning fluid storage reservoir to be adjusted, and therefore makes it easier for the cleaning system to be installed in the vehicle, while at the same time lightening the latter.

According to various features, considered separately or in combination:

- the electronic control unit is configured to generate an instruction for controlling the electronically controlled pump on the basis of a number of sensors to be cleaned. According to various examples, this may, for example, relate to a total number of sensors installed on the vehicle, or this may relate to a number of sensors of the same type, or to a number of sensors having similar cleaning requirements.
- the electronic control unit for the electronically controlled pump is configured to generate an instruction for controlling the pump on the basis of an external temperature. The external temperature is to be understood here as meaning the temperature to which is subjected the cleaning fluid circulating in the branch or branches of the fluid circuit supplying the spray device or devices corresponding to the sensor(s) to be cleaned. Because the viscosity of the cleaning fluid can vary according to such a temperature, taking this temperature into consideration when formulating the instruction for controlling the electronically controlled pump makes it possible to increase the precision with which the chosen flow parameter is adjusted.
- the electronic control unit for the electronically controlled pump is configured to generate an instruction for controlling the pump on the basis of a speed of travel of the vehicle. Specifically, a high speed of travel may have the result of causing the cleaning fluid to disperse as it is being sprayed onto the optical surfaces of the sensors that are to be cleaned, which will result in a loss of cleaning fluid. Adjusting the flow of the cleaning fluid using the electronically controlled pump defined hereinabove, and notably adjusting the pressure of the fluid as it leaves the spray devices, then makes it possible to reduce the impact that such a dispersion might have on the effectiveness of the cleaning of the sensor or sensors concerned.
- the electronic control unit for the electronically controlled pump is configured to generate a control sequence for controlling the operation of the solenoid valves of the distribution circuit. Advantageously, the aforementioned control consists chiefly in verifying whether one or more solenoid valves of the distribution circuit is/are in the open and/or closed state. Preferentially, the aforementioned control consists chiefly in verifying whether one or more solenoid valves of the distribution circuit is/are in the closed state. More specifically, the invention makes provision that, in a vehicle equipped with a cleaning system as described hereinabove, when one or more sensors require a cleaning operation, a cleaning request is carried to the electronic management unit of the distribution circuit, defined hereinabove. For example, such a cleaning request may come from a central control module of the vehicle configured to communicate with all of the sensors with which the vehicle is equipped. Advantageously, the aforementioned cleaning request comprises one or more items of information relating, for example, to the number and/or the type of sensors that are to be cleaned, as well as, for example, their location on the vehicle. According to one aspect of the invention, when these items of information are transmitted to the electronic management unit of the fluid circuit, the electronic control unit for the electronically controlled pump generate a control sequence for controlling one or more solenoid valves of the distribution circuit. According to one advantageous example, this control sequence is performed on the solenoid valves that govern the distribution of cleaning fluid to one or more sensors of the same type as the one or ones targeted by the previously-defined cleaning request and/or installed, on the vehicle, in the vicinity of the sensors targeted by the aforementioned cleaning request. In the latter instance in particular, it is notable that sensors arranged in the vicinity of one another may be configured to acquire redundant information about the same roadscene, so as to ensure that the most faithful possible image of the roadscene is obtained, and a driving assistance system, and in particular one for controlling a self-driving vehicle, needs the entire roadscene to be detected continuously. It is thus necessary to ensure that at least one of the sensors that has the function of detecting the events in such a roadscene is operational.

A consequence of the foregoing is that the invention also relates to a method for cleaning at least one of a plurality of sensors of a motor vehicle using a cleaning system as has just been described, such a method comprising:

- a step whereby an electronic management unit of a cleaning fluid distribution circuit of the cleaning system, which unit is configured to communicate with the electronic control unit of an electronically controlled pump of the cleaning system, receives a request to clean at least one of a plurality of sensors,
- a step of identifying at least one solenoid valve of the distribution circuit governing the routing of cleaning fluid to said at least one of the plurality of sensors to be cleaned,
- a step whereby the electronic control unit of the electronically controlled pump generate an instruction to modify a parameter pertaining to the flow of the cleaning fluid in the distribution circuit on the basis of the type of the solenoid valve or valves identified in the previous step.

Advantageously, the method according to the invention may also comprise a step of generating a control sequence for controlling the operation of one or more solenoid valves of the distribution circuit.

The invention also relates to a motor vehicle equipped with a cleaning system according to that which has been described hereinabove.

BRIEF DESCRIPTION OF DRAWINGS

Further features, details and advantages of the invention will become more clearly apparent from reading the following description, which is provided by way of illustration and with reference to drawings in which.

It should first of all be noted that although the figures set out the invention in detail for implementing the invention, these figures may of course be used in order to better define the invention if necessary. It should also be noted that these figures set out only some of the possible exemplary embodiments according to the invention.

DETAILED DESCRIPTION

Figure 1:
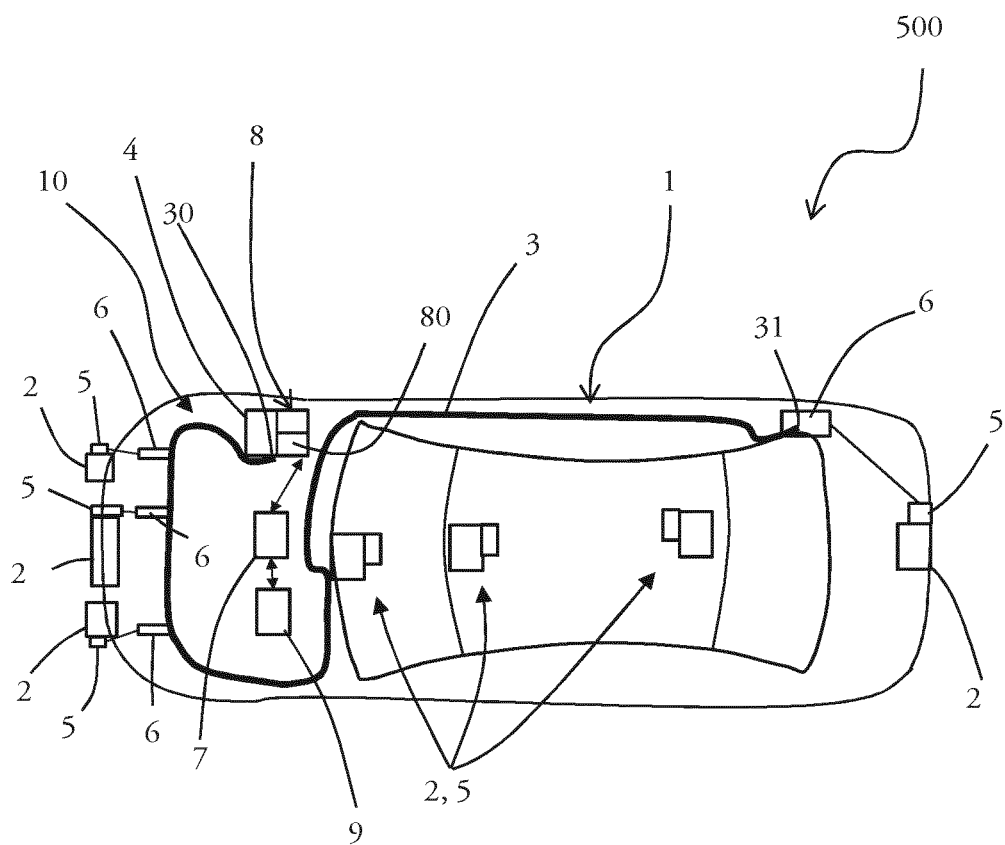
FIG. 1 is a schematic view of a motor vehicle equipped with a cleaning system according to the invention, and FIG. 2 schematically illustrates the various steps of a method according to the invention.

FIG. 1 schematically illustrates, in a view from above, a motor vehicle 500 equipped with a cleaning system 1 according to the invention, which allows the cleaning of a plurality of sensors 2 installed on the vehicle 500. By way of nonlimiting example, the sensors 2 may be optical sensors, for example configured to detect various items of information relating to the surroundings of the vehicle (non-exhaustively: the line of the road on which the vehicle is moving, the presence of obstacles, etc.) in order to provide assistance with the driving of the vehicle.

With reference to FIG. 1, the cleaning system 1 according to the invention comprises a fluid conveying duct 3 configured to convey a cleaning fluid from a storage reservoir 4 as far as a plurality of cleaning fluid spray devices 5, the spray devices 5 being arranged, in the vehicle 500, to be associated with the sensors 2. According to various examples, one spray device 5 may be associated with each sensor 2, or one distribution device 5 may be associated with several sensors 2, or several distribution devices 5 may be associated with the one same sensor 2.

Each spray device 5 is connected to the fluid conveying duct 3, independently of the other spray devices 5, by one or more pipes which have not been depicted in FIG. 1. These pipes, together with the spray device or devices 5 with which they are associated, form branches of the distribution circuit 10, as defined hereinabove. The fluid conveying duct 3 thus supplies cleaning fluid to all of the spray devices 5 installed on the vehicle 500. As indicated hereinabove, the cleaning fluid may be liquid or gaseous; by way of nonexhaustive examples, the cleaning fluid may be water, a washer fluid, or air.

According to the example more particularly illustrated in FIG. 1, the fluid conveying duct 3 extends, within the vehicle 500, between a first end 30 situated at the front of the vehicle 500 and a second end 31 situated near the rear of same. However, it will be appreciated that, without departing from the context of the invention, the fluid conveying duct may adopt other configurations, and for example may take the form of a loop.

Advantageously, a solenoid valve 6 is positioned between each spray device 5 and the fluid conveying duct 3, the activation of a solenoid valve 6 allowing all or some of the fluid circulating in the fluid conveying duct to be drawn off so as to be directed toward the corresponding spray device 5.

The fluid conveying duct 3, the storage reservoir 4, the spray devices 5 and the solenoid valves 6 together form a cleaning fluid distribution circuit 10 within the cleaning system 1 according to the invention. The solenoid valves 6 may be arranged as an array or may be distributed along the fluid conveying duct 3, as illustrated schematically in FIG. 1.

The cleaning system 1 according to the invention also comprises an electronic management unit 7 configured to control the operation of the distribution circuit 10. More specifically, the electronic management unit 7 notably controls the operation of the solenoid valves 6 and of the spray devices 5 defined hereinabove, for example using a carrier current in a control line extending into the distribution circuit or using wireless communication of radio type.

According to the invention, the cleaning system 1 also comprises an electronically controlled pump 8 configured to control the routing of the cleaning fluid from the storage reservoir 4 to each of the spray devices 5. As shown by FIG. 1, the electronically controlled pump 8 is arranged at the outlet of the storage reservoir and connected to the first end 30, defined hereinabove, of the fluid conveying duct 3.

According to the invention, the electronically controlled pump 8 is configured to modify a parameter pertaining to the flow of the cleaning fluid within the distribution circuit 10 defined hereinabove.

The flow parameter modified by the electronically controlled pump 8 may notably here be a pressure of the cleaning fluid within the distribution circuit 10. Specifically, because the sensors 2 may be of different types, the demands relating to the cleaning of their optical surfaces may vary from one sensor 2 to another sensor 2, for example in terms of the pressure of the cleaning fluid. By way of example, as indicated hereinabove, the cleaning of an optical surface of a sensor of an assembly of LIDAR type requires a cleaning fluid pressure of the order of 4 bar, whereas the cleaning of an optical surface of an optical camera requires a cleaning fluid pressure of the order of just 2 bar.

Alternatively, the aforementioned flow parameter may be a flow rate of the cleaning fluid.

According to the invention, the electronically controlled pump 8 comprises electronic control unit 80, depicted schematically in FIG. 1, configured to modify the rotational speed of the electric motor driving the electronically controlled pump 8, and thus modify the flow of the cleaning fluid conveyed by said pump.

As will be described more fully in connection with the description of a cleaning method, it will be appreciated that the invention thus allows a parameter pertaining to the flow of the cleaning fluid throughout the distribution circuit 10 to be modulated according to the solenoid valve or valves 6 which will be activated and the distribution devices which will be supplied with the cleaning fluid circulating in the duct 3. If the cleaning system is used for cleaning a sensor of an assembly of LIDAR type, the electronic control unit 80 control the electronically controlled pump 8 to make it deliver a cleaning fluid at a pressure of 4 bar to the entire distribution circuit. If, at the same time, notably in another part of the vehicle, a sensor of the viewing camera type needs to be cleaned, the cleaning fluid at the pressure of 4 bar will be used even though the sufficient pressure for optimal cleaning is 2 bar. On the other hand, if the cleaning system is used only for cleaning one or more sensor(s) of the viewing camera type, the electronic control unit 80 control the electronically controlled pump 8 to make it deliver a cleaning fluid at a pressure of 2 bar to the entire distribution circuit.

Furthermore, the electronically controlled pump is configured to receive data relating to the driving conditions of the vehicle, these including data relating to the conditions specific to the vehicle such as its speed as well as external conditions such as the ambient temperature. The electronically controlled pump is configured to determine instructions for the flow of the cleaning fluid on the basis of these data.

Advantageously, the invention provides for the electronic control unit 80 of the electronically controlled pump 8 and the electronic management unit 7 of the distribution circuit 10 to be configured to communicate with one another.

Figure 2:
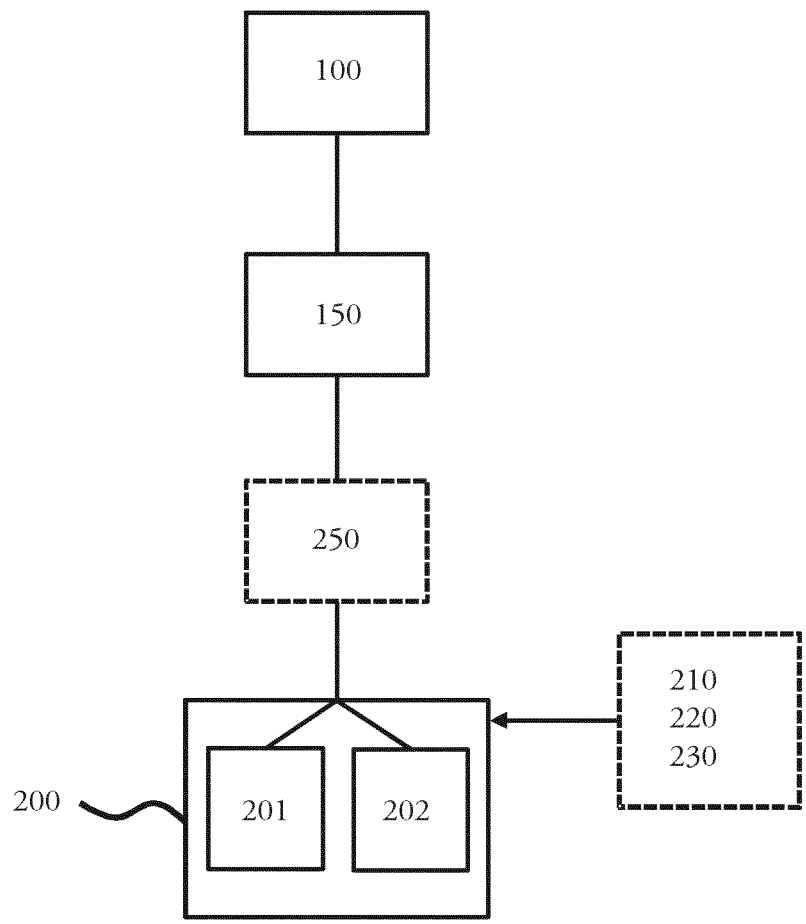

FIG. 2 schematically illustrates a cleaning method implementing a cleaning system 1 as has just been described.

With reference to FIG. 2, such a method comprises a first step 100 whereby the electronic management unit 7 of the distribution circuit 10 receives a request to clean one or more sensor(s) 2 installed on the vehicle 500. Depending on whether the cleaning system is incorporated as original equipment on the vehicle or whether it is retrofitted to an existing vehicle, this cleaning request may be transmitted directly to the electronic management unit 7 of the distribution circuit 10 or else transmitted by a control module of the vehicle 9, which module is configured to communicate with all of the sensors 2 installed on the vehicle 500. According to one example, the control module 9 may comprise a storage unit for storing a collection of information items relating to the cleaning of the various sensors 2: these may, for example, be operational parameters such as, non-exhaustively, a duration of spraying of the cleaning fluid onto the optical surface of these sensors, a cleaning fluid pressure or flow rate to be employed in order to clean the sensors that are to be cleaned.

The method according to the invention next comprises a step 150 of identifying one or more solenoid valve(s) 6 of the distribution circuit 10 governing the routing of cleaning fluid toward the plurality of sensors 2 targeted by the cleaning request received during the first step 100 described hereinabove. It should be noted that when the cleaning system is being installed on the vehicle, pairing data are stored in the memory of the electronic management unit 7 of the distribution circuit, so that this electronic management unit 7 is able to extract information as to which particular sensor targeted by the cleaning request is to be cleaned via which particular spray devices, if appropriate which plurality of spray devices, and therefore which particular solenoid valve, if appropriate which plurality of solenoid valves, should be activated to clean said sensor. Nonlimitingly as regards the invention, these pairing data may be incorporated into the electronically controlled pump of the reservoir.

In a next step 200 of the method according to the invention, the electronic management unit 7 of the distribution circuit 10 and the electronic control unit 80 of the electronically controlled pump 8 control the conveying of cleaning fluid to the spray devices 5 associated with the sensors 2 that are to be cleaned, and the delivery of cleaning fluid by the aforementioned spray devices 5. More specifically, the electronic control unit 80 of the electronically controlled pump 8 in a first sub-step 201 control the flow of cleaning fluid into the fluid conveying duct at a suitable pressure and flow rate, and the electronic management unit 7 of the distribution circuit 10 in a second sub-step 202 controls the operation of the solenoid valves 6 to direct the fluid to the branches of the distribution circuit 10, and the operation of the spray devices 5 mentioned hereinabove.

As indicated hereinabove, according to the invention, the flow of cleaning fluid toward the spray devices 5 is governed and modulated by the electronically controlled pump 8, on the basis of one or more items of data relating to the cleaning operation that is to be performed.

According to one example, the flow of the cleaning fluid can be modulated on the basis of a parameter 210 representative of a type and/or a number of sensors 2 of which the optical surface is to be cleaned. As described hereinabove, the pressure of the cleaning fluid able to circulate in the duct 3 leaving the storage reservoir can thus be modulated, according to the sensor that is to be cleaned, and therefore according to the reference of the solenoid valve that will be activated and thus allow the fluid to pass toward the appropriate spray device.

According to another example, the flow of the cleaning fluid can be modulated on the basis of a temperature 220 to which the cleaning fluid is subjected, so as to take any potential variation in the viscosity of the cleaning fluid into consideration. The electronic management unit 7 of the distribution circuit 10 or the electronic control unit 80 of the electronically controlled pump 8 are configured to receive and process ambient temperature information, the processing of this information consisting in determining, via a calculation table, an optimum pressure or flow rate for the cleaning fluid that is to be sprayed onto the sensor that is to be cleaned as a function of a given temperature. For a sensor that requires a cleaning fluid pressure of 4 bar under standard temperature conditions, the electronically controlled pump 8 will modulate the pressure of the cleaning fluid when this sensor needs to be cleaned under different temperature conditions: in particular, the cleaning fluid pressure will be increased when the temperature is lower, with the risk that the viscosity of the cleaning fluid will have increased making it more difficult to spray onto the sensor.

According to yet another example, the modulation of the flow of the cleaning fluid may take into account a speed 230 of travel of the vehicle 500, so as to limit the effects of possible dispersion of the cleaning fluid around the sensor 2 that is to be cleaned as this cleaning fluid is being sprayed by one or more spray devices 5.

According to the example illustrated in FIG. 2, the method as has just been described comprises an additional step 250 of generating a control sequence controlling the operation of one or more solenoid valves 6 of the distribution circuit 10. The control sequence generated during the additional step 250 is aimed at verifying whether the sensors not targeted by a cleaning request are operational and able to perform their function of acquiring data regarding the roadscene surrounding the vehicle. As has been specified, the cleaning of a sensor implies that, for the time for which this operation lasts, the sensor is no longer capable of sending reliable data to the driving assistance system and it is appropriate to ensure that the sensors directly neighboring the one that is to be cleaned are operational. According to this feature of the invention, the verification of the operational status of the sensors includes verifying whether the corresponding solenoid valves 6 are in the open or closed state.

One option during this additional step is to issue a general request to each of the solenoid valves to verify the open or closed state of all of the solenoid valves.

Another option is to target the solenoid valves to which these requests are sent, according to which sensor has been the subject of a request for cleaning. According to various examples, the solenoid valves 6 the operational status of which is verified during the additional step 250 are those governing the conveying of cleaning fluid to the branches of the distribution circuit 10 that are associated with the sensors 2 which, within the vehicle 500, have a role similar to the role of the sensors 2 that are to be cleaned in the cleaning operation that is to be performed, or the parameters governing the cleaning of which are similar to the parameters governing the cleaning of those sensors. In another example, the solenoid valves 6 the operational status of which is verified during the additional step 250 are those governing the conveying of cleaning fluid to the branches of the distribution circuit 10 that are associated with the sensors 2 situated in the immediate vicinity of the sensors 2 that are to be cleaned.

Thus, with reference to FIG. 1, in the event of a request to clean a first sensor 2, for example a sensor of LIDAR type operating by emitting/receiving electromagnetic waves positioned on the front face of the vehicle, being transmitted to the electronic management unit 7 of the distribution circuit 10, the additional step 250 defined hereinabove may consist in checking the status of the solenoid valves 6 governing, for example, the distribution of cleaning fluid to the other sensors arranged on the front face and liable to acquire data that is redundant with respect to the data detected by the first sensor.

In other words, while the additional step 250 makes it possible, on the one hand, to avoid any cleaning fluid escaping toward a spray device 5 not involved in the cleaning operation being performed during the method according to the invention, it also, on the other hand, makes it possible to ensure that the operation of cleaning a first sensor can be performed under safe conditions, with the other sensors capable of detecting information about the same portion of the roadscene as the first sensor being perfectly operational. If that is not the case, namely if the operation of cleaning the first sensor cannot be performed without a risk of a loss of information, a message can be sent to the driver, or to the central module controlling the self-driving of the vehicle, to indicate thereto that a cleaning operation needs to be performed and that in order to do so the vehicle needs to be stopped.

This is of particular benefit in the case of self-driving vehicles 500, in which several sensors 2 of the same type may be installed in the vicinity of one another in order to supply a vehicle control unit with a collection of data of the same kind which are used for driving this vehicle. Such data of the same kind may for example be images taken from different viewing angles, of a scene ahead of the vehicle 500. It will be readily appreciated that, in such a context, an operation of cleaning a sensor that captures such an image will advantageously be conditional on the vehicle control unit continuing to receive quality images coming from sensors of the same kind situated in the vicinity of the sensor or sensors cleaned.

The invention, as has just been described, and the cleaning method to which it extends, therefore, by simply modulating a parameter pertaining to the flow of a cleaning fluid in a distribution circuit, allows effective cleaning of a plurality of sensors 2 of a motor vehicle 500, with an optimized cleaning fluid consumption.

However, the invention as has just been described should not be limited to the means and configurations exclusively described and illustrated, and also applies to all equivalent means or configurations and to any combination of such means or configurations, provided that these combinations result in a modulation of the flow of a cleaning fluid within a distribution circuit like that described in the present document.

The invention claimed is:

1. A method for cleaning, by a system, at least one of a plurality of sensors of a motor vehicle, the system comprising:
    a plurality of devices for spraying a cleaning fluid onto the sensors,
    a cleaning fluid storage reservoir,
    a distribution circuit connected to the storage reservoir and to which each of the spray devices is connected via a respective solenoid valve, an electronic management unit configured to control an operation of at least the distribution circuit, and an electronically controlled pump, wherein the pump has an electronic control unit configured to modify a parameter pertaining to a flow of the cleaning fluid in the distribution circuit, the method comprising:

receiving, by the electronic management unit of the distribution circuit of the cleaning system, a request to clean at least one of a plurality of sensors;

identifying one or more solenoid valves of the distribution circuit governing a routing of the cleaning fluid to the at least one of the plurality of sensors to be cleaned;

generating, by the electronic control unit, an instruction to modify a parameter pertaining to the flow of the cleaning fluid in the distribution circuit; and generating, by the electronic control unit, an instruction to control the pump based on an external temperature.

2. The method as claimed in claim 1, further comprising modifying, by the electronic control unit, a pressure of the cleaning fluid in the distribution circuit.

3. The method as claimed in claim 1, further comprising modifying, by the electronic control unit, a flow rate of the cleaning fluid in the distribution circuit.

4. The method as claimed in claim 1, further comprising generating, by the electronic control unit, an instruction for controlling the pump based on data relating to a nature of the at least one of the plurality of sensors to be cleaned.

5. The method as claimed in claim 1, further comprising generating, by the electronic control unit, a control sequence signal for controlling the operation of the solenoid valves of the distribution circuit.

6. The method as claimed in claim 1, further comprising generating, by the electronic control unit, an instruction for controlling the pump based on a number of sensors to be cleaned.

7. The method as claimed in claim 1, further comprising generating, by the electronic control unit, an instruction for controlling the pump based on a speed of the vehicle.

* * * * *